US008670467B2

(12) United States Patent
Latremouille

(10) Patent No.: US 8,670,467 B2
(45) Date of Patent: *Mar. 11, 2014

(54) NETWORK SYNCHRONIZED TIME BASE TIMER

(75) Inventor: Damien Latremouille, Ottawa (CA)

(73) Assignee: Applied Micro Circuits Corporation, Suunyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,382

(22) Filed: Apr. 11, 2012

(65) Prior Publication Data
US 2012/0213318 A1    Aug. 23, 2012

Related U.S. Application Data

(63) Continuation of application No. 11/444,003, filed on May 31, 2006, now Pat. No. 8,179,924.

(51) Int. Cl.
*H04J 3/06* (2006.01)
(52) U.S. Cl.
USPC .......................................................... 370/509
(58) Field of Classification Search
USPC ..................... 370/324, 350, 395.62, 503–520
See application file for complete search history.

(56) References Cited

U.S. PATENT DOCUMENTS

| 5,930,294 A * | 7/1999 | Chapman ....................... 375/213 |
| 7,103,072 B1 * | 9/2006 | Sloan et al. .................... 370/503 |
| 2002/0137533 A1 * | 9/2002 | Struhsaker et al. ........... 455/502 |

* cited by examiner

*Primary Examiner* — Ricky Ngo
*Assistant Examiner* — Wei-Po Kao
(74) *Attorney, Agent, or Firm* — Turocy & Watson, LLP

(57) ABSTRACT

A system and method are provided for synchronizing a programmable timer time base and external time signal. The method either accepts or supplies an external time signal (e.g., IEEE 1588) at an external interface, links a synchronized time base to the external time signal, and clocks a channel time base with the synchronized time base. Then, a timer channel can be used to perform programmable timer functions in response to the channel time base. Some programmable timer functions include input capture, output compare, quadrature decoding, pulse measurement, frequency measurement, and pulse width modulation (PWM) functions, in one aspect, accepting the external time signal at the external interface includes detecting a packet with a time value, in another aspect, the method uses the channel to detect an event at a channel external interface, and compares the channel time base counter value with an expected value to modify the synchronized time base.

21 Claims, 4 Drawing Sheets

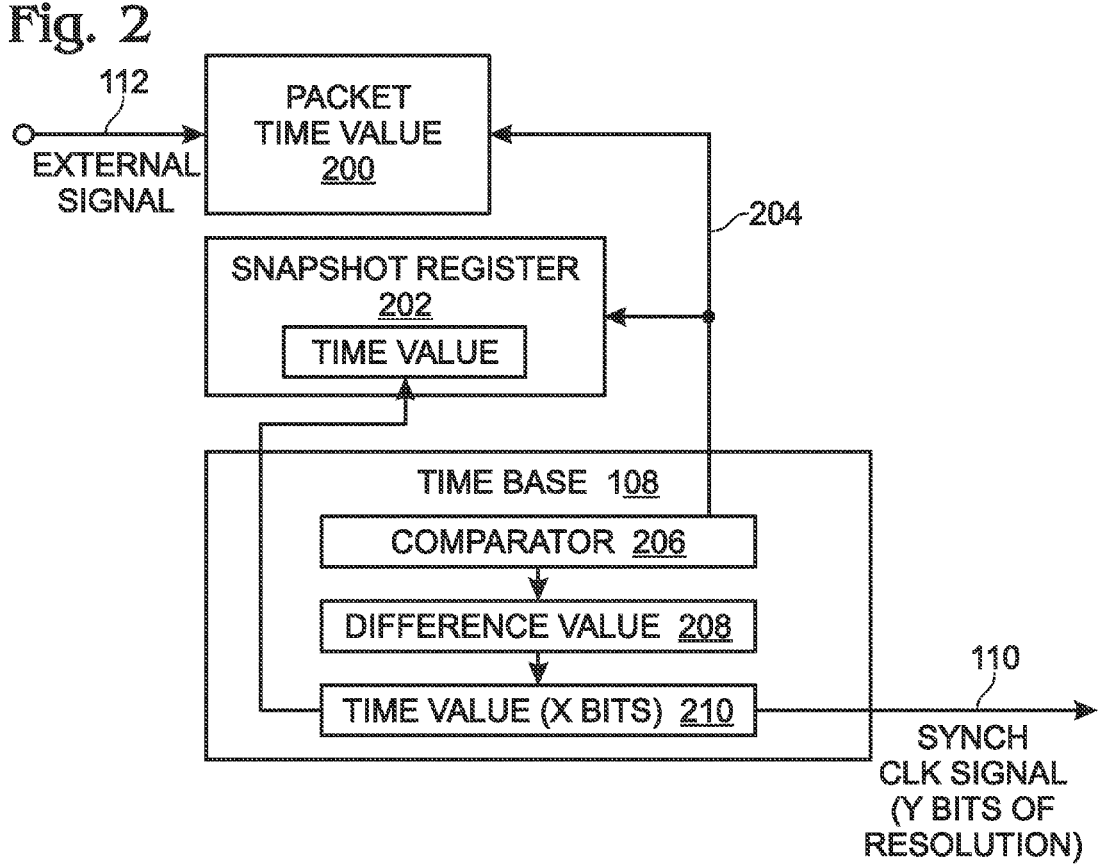
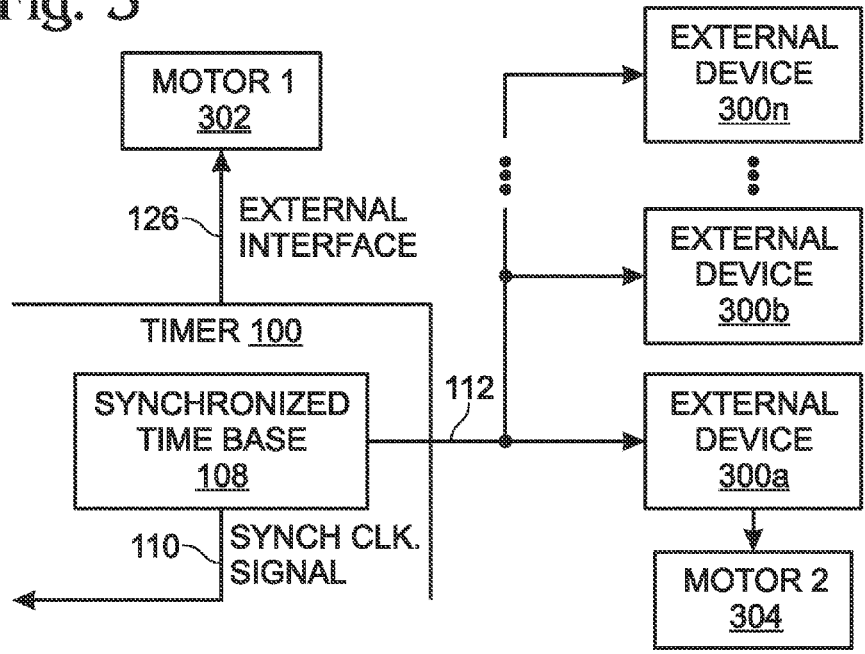

NETWORK SYNCHRONIZED TIME BASE TIMER

RELATED APPLICATIONS

This application is a Continuation of a patent application entitled, TIMER WITH NETWORK SYNCHRONIZED TIME BASE, invented by Damien Latremouille et al., Ser. No. 11/444,003, filed May 31, 2006, now U.S. Pat. No. 8,179,924, which is incorporated herein by reference.

BACKGROUND OF THE INVENTION

1. Field of the Invention

This invention generally relates to an electrical programmable event timer and, more particularly, to a timer that can be synchronized to operate with an external or network-derived time base.

2. Description of the Related Art

Programmable timers are widely used in the data processing and machine control fields. Some of the common tasks performed by most timers include input capture and output compare. An input capture function records ("captures") the time at which an external event (electrical signal) occurs. For example, input capture may be used to read a limit switch or a temperature. An output compare function generates an output signal in response to programmed time intervals. For example, output compare can be used to run an electrical motor or solenoid. Input capture and output compare functions can be modified in response to commands from an associated programmable logic controller (PLC), programmable controller (PC), or microprocessor, and they may also be used to trigger interrupts in the PC program.

From these relatively simple functions, more complex operations such as pulse width modulation (PWM) can be performed using multiple cooperating channels, to operate a motor for example. A predetermined pulse width can be represented as a digital value, stored in a first timer channel register, and used to perform the pulse width modulation function. A second timer channel register can be used to store a first period value—the period of the pulse width. Likewise, a third timer channel register can be used to store a second (shorter) period value, which can be used to make the pulse width narrower, if feedback signals dictate that such an action is necessary.

The use of such dedicated circuitry insures that pulses are generated with the necessary pulse width, with a minimum of latency, if the pulse width must be made longer or shorter. A timer can perform at greater number of operations, more smoothly, with the assistance of an associated microprocessor. Using the master and slave registers presented above, the timer uses simple state logic to load the next data word from the slave register into the master register for a two-step operation, when the timed events are responding "normally". However, in the event of an abnormal situation, the microprocessor can directly load a word into the master register, from memory, that is more appropriate for the situation.

For the sake of increased flexibility, some timer designs have opted to have all channel service operations performed in response to the execution of microprocessor/software instructions. However, the microprocessor consumes system resources. Generally, the microprocessor is responsible for other functions besides servicing the timer channels. Further, the latency associated with microprocessors and software instructions is much greater than hardware logic operations. Even more critical, the cost of designing the software to run a microprocessor-based timer can be very high.

The advantages associated with a timer that can perform operations independent of, or minimally dependent upon a PC, can become liabilities when the timer must be used in cooperation with other timers, or with other devices whose operations must be centrally controlled (e.g., by the PC). In these situations, it may be desirable to run all the cooperating devices, including the timer(s), from a common clock. While the PC may be enabled to run the cooperating operations, using the PC's clock as the central time base, this method of operation may be an inefficient use of the PC. Further, the latency associated with microprocessors and software instructions is much greater than hardware logic operations. Even more critical, the cost of designing the software to run the PC in this manner can be very high.

In a distributed control system using multiple clocks, individual clocks tend to drift apart. Some kind of correction mechanism is necessary to synchronize the individual clocks to maintain global time, which is accurate to some requisite clock resolution. For example, the IEEE 1588 standard for a precision clock synchronization protocol can be used for networked measurement and control systems. The IEEE standard defines several messages that can be used to exchange timing information. However, conventional timer cannot be synchronized to external sources such as IEEE 1588.

It would be advantageous if a timer channel time base could be easily synchronized with an external source.

It would be advantageous if a programmable timer could be synchronized for use as a system or network timing source.

SUMMARY OF THE INVENTION

The present invention describes a timer whose channel time base can be synchronized to an external source, such as network-connected source. Network-synchronized programmable timer functions permit a user to distribute conventional timer functions across multiple devices with a high level of accuracy. Input capturing and output generation, for example, can be coordinated between multiple devices using independent clocking sources with a timing accuracy limited only by the hardware implementation.

Accordingly, a method is provided for synchronizing a programmable timer time base and an external time signal. The method accepts or supplies an external time signal (e.g., IEEE 1588) at an external interface, links a synchronized time base to the external time signal, and clocks a channel time base with the synchronized time base. Then, a timer channel can be used to perform programmable timer functions in response to the channel time base. Some programmable timer functions include input capture, output compare, quadrature decoding, pulse measurement, frequency measurement, and pulse width modulation (PWM) functions. For example, the method may supply counter values to the channel from the channel time base, and perform a channel input capture function in response to the channel time base counter values.

In one aspect, accepting the external time signal at the external interface includes detecting a packet with a time value. Then, referencing the synchronized time base to the accepted external time signal includes: writing the contents of the synchronized time base into a snapshot register; freezing the contents of the snapshot register; comparing the detected packet to the contents of the snapshot register; calculating a difference value; and, modifying the synchronized time base by the difference value.

In another aspect, the method uses the channel to detect an event at a channel external interface, and stores a channel time base counter value occurring at the time of the detected event. Then, referencing the synchronized time base to the external time signal includes: comparing the stored channel time base counter value with an expected value; calculating a difference value; and, modifying the synchronized time base by the difference value.

Additional details of the above-described method and a programmable timer system for synchronizing a time base to an external signal are provided below.

BRIEF DESCRIPTION OF THE DRAWINGS

FIG. 2 is a schematic block diagram depicting an exemplary snapshot register.

FIG. 3 is a schematic block diagram the synchronized time base of a timer supplying an external time signal.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 1:
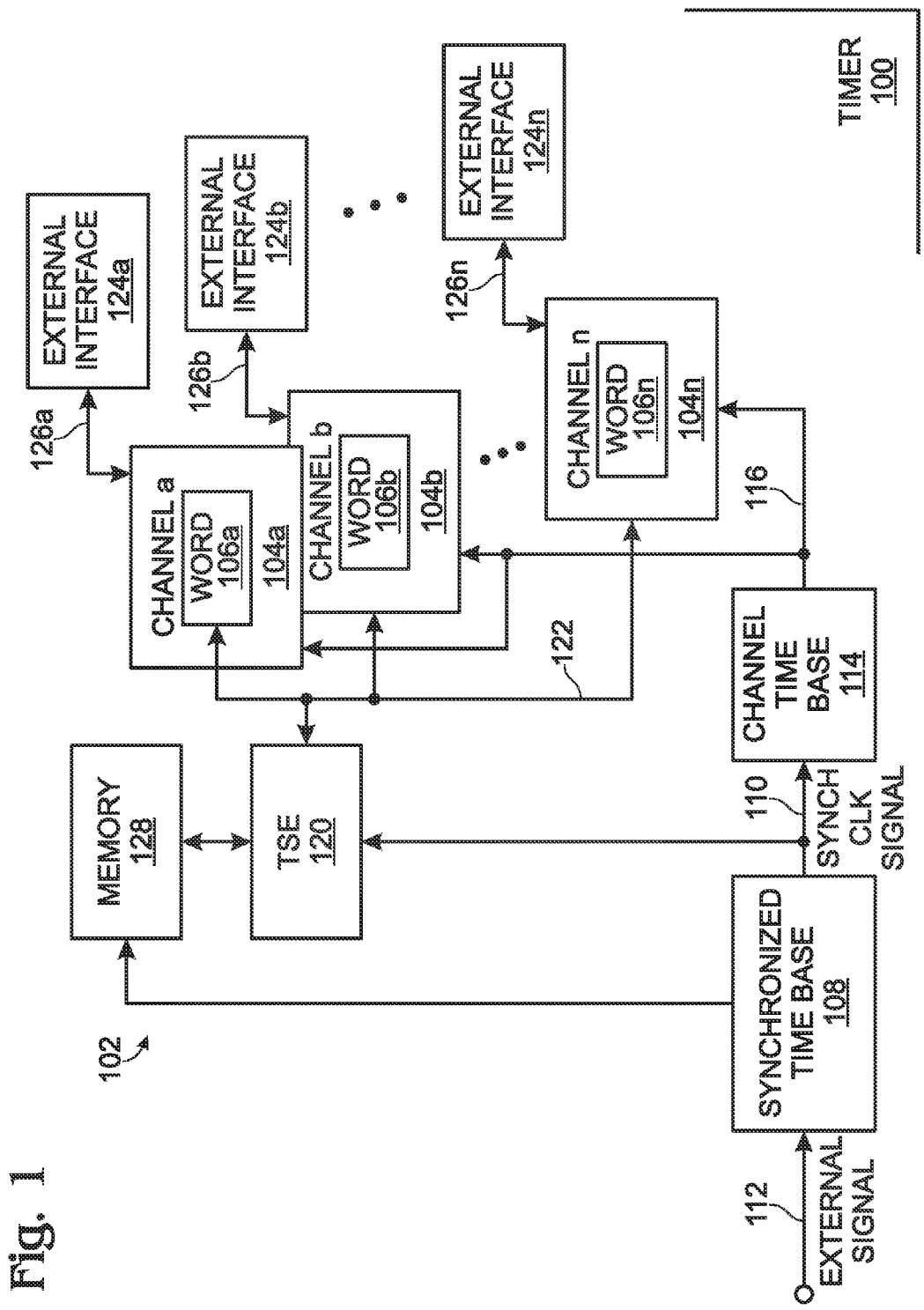
FIG. 1 is a schematic block diagram of a programmable timer with a system for synchronizing a time base and an external time signal.

FIG. 1 is a schematic block diagram of a programmable timer 100 with a system for synchronizing a time base and an external time signal. The system 102 comprises a channel 104 performing programmable timer functions in response to a loaded data word 106. Shown is a plurality of channels 104*a* through 104*n*, with respective data words 106*a* through 106*n*, where n is not limited to any particular number. A synchronized time base 108 having an interface on line 110 supplies a clock signal, which is linked to an external time signal received on line 112, also referred to herein as system time. A channel time base 114 has an interface on line 110 to receive clock signals from the synchronized time base 108, and an interface on line 116 to provide counter values to the channels 104*a* through 104*n*.

The synchronization interface on line 112 may accept an external time signal such as an IEEE 1588, Global Positioning Satellite (GPS), Ethernet Powerlink, Stratum TDM Synchronization, or Inter Range Instrumentation Group (TRIG) standards signal. In this aspect, the synchronized time base references the clock signal it supplies on line 110, to the external time signal it receives on line 112. The synchronized time base 108 is not necessarily limited to this list of external sources. In other aspects, the external time signal can be proprietary, or a modification of one of the above-mentioned external source examples.

FIG. 2 is a schematic block diagram depicting an exemplary snapshot register. In this example the synchronization interface 112 accepts a packet 200 with a time value, such as might be supplied from an IEEE 1588 source (not shown). A snapshot register 202 has an interface on line 204 to write the contents of the synchronized time base 108 into the snapshot register 202. The synchronized time base 108 freezes the contents of the snapshot register 202 when the packet 200 is received. A comparator 206 compares the contents of the snapshot register 202 to the packet 200, calculates a difference value 208 in response to the comparison, and modifies the synchronized time base 108 using the calculated difference value. It should be understood that the above-described functionality may be performed in hardware, with software, in cooperation between a microprocessor and stored microprocessor instructions, or with a combination of hardware and software.

In one aspect, synchronized time base establishes a time base 210 with "X" bits of resolution and provides a clock signal on line 110 with "Y" bits of resolution, less than, or equal to "X" bits. For example, the time base 210 may be maintained to 48 bits of resolution, the synchronized clock signal in line 110 may be only 32 bits.

Returning to FIG. 1, each channel 104 is capable of performing a number of conventional timer functions using the counter values supplied by the channel time base 114 on line 116. Some of these functions include input capture, output compare, quadrature decoding, pulse measurement, frequency measurement, and pulse width modulation (PWM) functions. However, channels 104*a* through 104*n* are not limited to just the performance of these exemplary functions. In one example, the channel 104*a* accepts counter values on line 116 from the channel time base 114, and performs a channel input capture function in response to the channel time base counter values. As noted above, the channel time base 114 is responsive to the synchronized time base 108, which may be synchronized to an external source.

In one aspect, the system 100 further comprises a timer service engine (TSE) 120 having an interface on line 110 to receive the clock signal from the synchronized time base 108. The TSE 120 has an interface on line 122 to service the channel(s) 104 with data words in a periodic cycle derived from the synchronized time base 108. The TSE 120 may establish a cycle having a first number of synchronized time base clock signals, and service each channel 104 for a second number of synchronized time base clock signals each cycle. In another aspect, the TSE 120 interacts with the plurality of channels 104*a* through 104*n* in a single cycle, and services each channel within the cycle. For example, if n=16, the TSE 120 may establish a cycle of 64 clock signals, servicing each channel a maximum of four clock signals every cycle, in another aspect of the system, the sequence of servicing may be programmable. For example, the sequence of channel service may be: 1, 1, 1, 2, 1, 3, 1, 4, 1, 5, 1, 6, . . . to . . . 1, n−1, 1, n, or any other sequence.

In another aspect, the channel external interfaces (i.e., pins) can be used for synchronizing time base 108. As shown, channels external interfaces 124a through 124n, are respectively connected to channels 104a through 104n, via lines 126a through 126n. A channel (e.g., channel 104a) detects an event at a channel external interface 124a. The channel 104a also detects the channel time base counter value on line 116 that occurs when the event is detected. The TSE 120 stores the channel time base counter value in memory 128. The synchronized time base 108 compares the stored channel time base counter value with an expected value (the value of the synchronized clock signal on line 110 when the event occurred), calculates a difference value, and modifies the synchronized time base by the difference value.

Although the timer has been described as servicing the channels in fixed periodic time intervals through the operation of the TSE 120, in other aspects the timer may include a microprocessor (not shown), which may service the channels as a result of stored software instructions. In this microprocessor aspect, the microprocessor would be clocked directly by the synchronized time base 108, or indirectly through an intermediate source that uses the synchronized time base as a reference.

FIG. 3 is a schematic block diagram the synchronized time base of a timer supplying an external time signal. In this aspect the synchronization interface on line 112 is used to supply a clock signal to one or more external devices. Shown are external devices 300a, 300b, and 300n, where n is not limited to any particular number. Alternately stated, timer 100 acts as an external or network timing reference for a network of connected devices.

When synchronizing distributed clocks, usually a less accurate clock (the slave clock) is adjusted to track a more accurate clock (the master clock). In this example the timer 100 acts as the master clock and external device 300 may be associated with the slave clock.

In one aspect, the external devices 300 are also timers with synchronized time bases. Then, the external device timers 300 tie their programmable timer functions to a "synchronized" clock. For example, timer 100 may be used to control motor 1 (302), while timer 300a controls motor 2 (304). Timer 100 is designated as the master, and timer 300a is designated as the slave. The master 100 transmits the system time as an external signal on line 112 and the slave 300a receives it. Devices 100 and 300a synchronously control their respective motors 302 and 304. Both devices 100/300a use network synchronized programmable timer functions, but one device (100) is transmitting the system time while the other device 300a) is receiving it.

Functional Description

Figure 4:
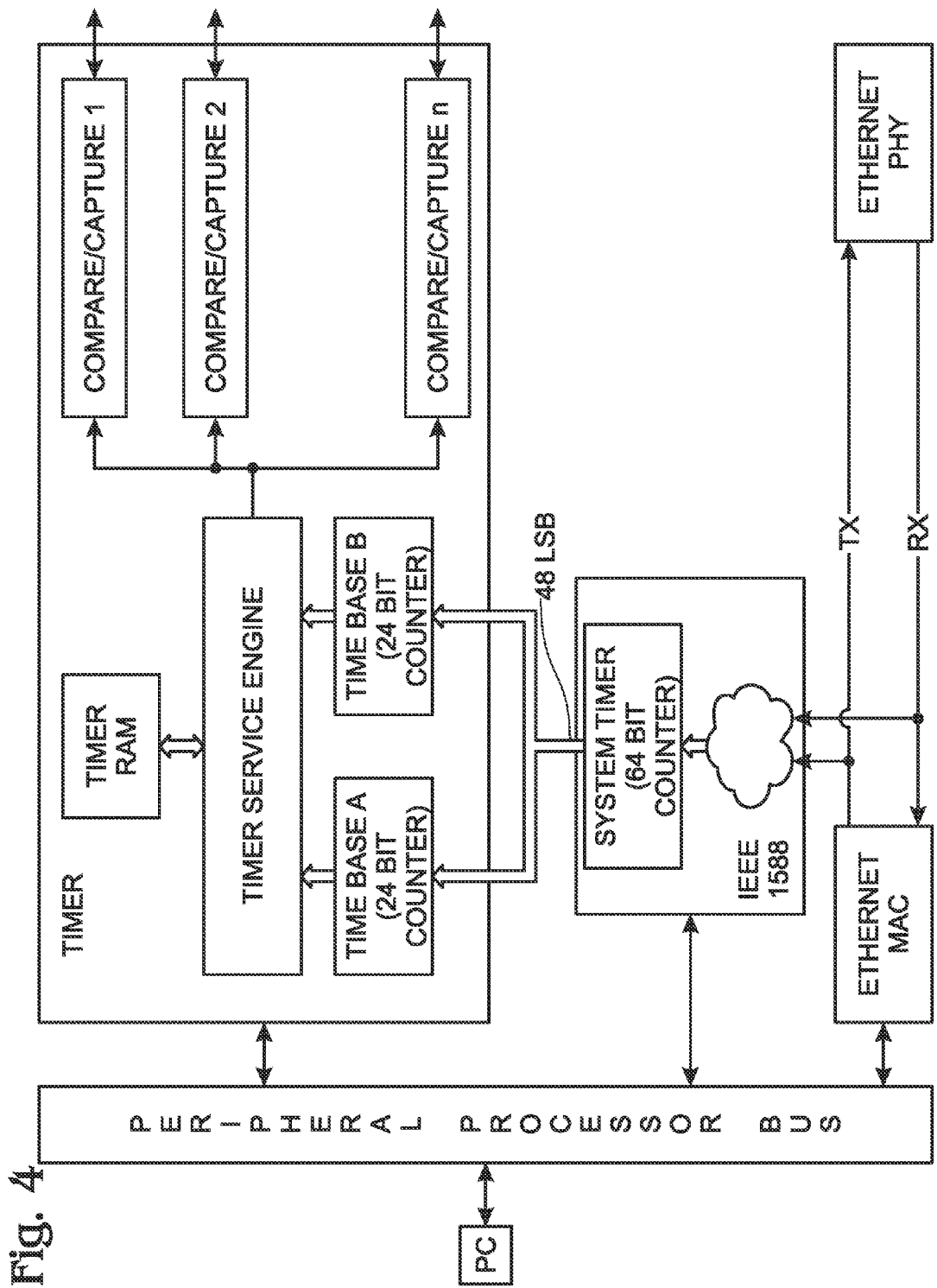
FIG. 4 is a schematic block diagram depicting an exemplary variation of the timer of FIG. 1.

FIG. 4 is a schematic block diagram depicting an exemplary variation of the timer of FIG. 1. The timer service engine (TSE) controls and interfaces to a local timer RAM configured as one-hundred-twenty 32-bit words, with up to fifteen timer channels. The TSE provides the host interface to the PC and memory over the peripheral bus. This interface performs control and data line handshaking, along with requesting and acknowledging interrupts. The TSE acts as a state machine to control the timing and access to the RAM and timer channels. The TSE registers and arithmetic logic unit (ALU) permit the TSE to increment, decrement, and compare data. A data path switch controls the flow of data from the host interface. RAM, channels, and ALU, depending on the timer function being performed. TSE also manages interrupt requests to the PC.

Each channel has an input capture register or an output compare register. The timer interfaces with a peripheral bus to communicate to the PC. The timer can use its externally synchronized time base to perform PWM functions, including space vector PWM functions with non-overlap times. Further, the timer can use external pins to disable outputs, perform input capture, output compare, 48-bit input capture, 48-bit output compare, low electromagnetic compatibility (EMC) switching (with time-staggered outputs), up counters with modulus, down counters with modulus, and pulse period measurements, to name a few possible functions. The time can be configured to have seven 48-bit channels or fifteen 24-bi channels. As shown, the timer uses two channel time bases.

Time base A & B can be configured as free-running 24-bit up/down counters. Time base A & B are available to all channels for various functions. When the time base count reaches FFFFFF and rolls over to 000000, it can set the overflow flag and begin counting up again. The overflow flag can be cleared by the PC. The time base may also be used for generating center aligned PWM output pulses or edge aligned PWM pulses. In the center aligned PWM case, the time base counts up to a modulus value, reverses direction, and counts down to zero. When it reaches zero, it reverse again and counts up to the modulus.

The time bases may be driven by an external clock, as described herein, or an internal clock. A seven bit prescaler is also available for each time base. Each time base has a modulus register associated with it that can be used to set the maximum count for the time base. When the counter reaches the modulus it rolls over to zero when in the up counting mode. The time base can also be setup to count up and down. In the up/down mode, when the counter reaches the modulus, the counter reverses and starts counting down to zero.

The timer is interfaced to the PC by writing and reading the timer control registers, timer RAM, and timer channels. Once the timer channels and RAM are initialized, the timer functions run independently, generating output signals or measuring input signals. When a channel needs service from the PC, an interrupt is generated. The amount of data that is collected before the channel generates an interrupt is programmable. The channels connect to the outside world via pins on chip. Each channel has a pin associated with it. Each channel can either generate output signals or receive input signals.

The PC permits the timer to directly use an IEEE 1588 source as the synchronized clock signal (system time). For example, the 48 least significant bits of the IEEE 1588 time register can be wired to the external time base port of the timer. The IEEE 1588 IP core has been integrated into the PC using a bridge to a peripheral data bus, such as an on-chip peripheral (OPB) bus. The IEEE 1588 core can capture the system time clock (synchronized time base) into two auxiliary snapshot registers. An interrupt source in the PC or the synchronized time base itself can generate snapshot triggers. Note that events that trigger system time snapshots may need to be retimed by synchronized time base. Retiming snapshot events may introduce fixed or variable periods of latency.

Integrating conventional timer functions directly with the network or other external source has the following advantages. The user can distribute system time dependent timer functions across multiple separate networked elements.

There is an increase in the accuracy of conventional timer functions distributed across the network. There is a reduction of the total amount of variable latency in distributed timer functions by directly using the synchronized system time to drive timer functions. Timers capable of external synchronization permit the use of a unified time base for timer and network synchronization hardware. Permitting the use of real world system time, rather than mapping the current system time to an unrelated time base, simplifies conventional timer function programming. The user does not need to manage the time base to prevent loss of synchronization with the current system time. Finally, since both the system time and timer are clocked using a single clock source, ambiguity between external time and the time base of individual timers is eliminated.

Figure 5:
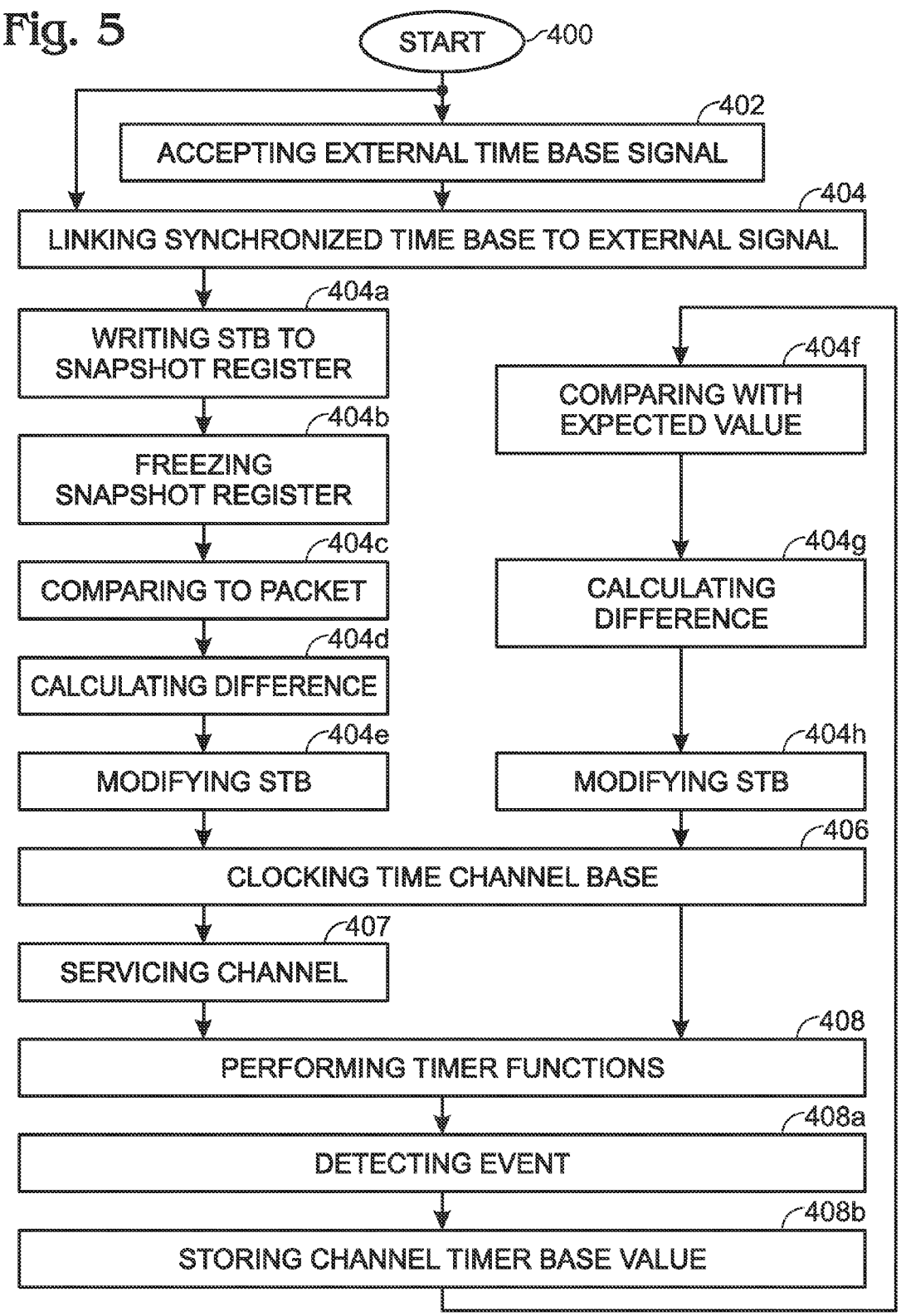
FIG. 5 is a flowchart illustrating a method for synchronizing a programmable timer time base and an external time signal.

FIG. 5 is a flowchart illustrating a method for synchronizing a programmable timer time base and an external time signal. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 404 links a synchronized time base to an external time signal. Step 406 clocks a channel time base with the synchronized time base. Step 408 uses a channel to perform programmable timer functions in response to the channel time base.

As noted earlier, some programmable timer functions include input capture, output compare, quadrature decoding, pulse measurement, frequency measurement, and pulse width modulation (PWM) functions. For example, using the channel to perform programmable timer functions in Step 408 may include supplying counter values to the channel from the channel time base, and performing a channel input capture function in response to the channel time base counter values.

In one aspect, Step 402 accepts an external time signal at an external interface. Examples of the external time signals include IEEE 1588, Global Positioning Satellite (GPS), Ethernet Powerlink, Stratum TDM Synchronization, or Inter Range Instrumentation Group (IRIG) standards. Then, linking the synchronized time base to the external time signal includes referencing the synchronized time base to the accepted external time signal.

In another aspect, accepting the external time signal at the external interface in Step 402 includes detecting a packet with a time value, such as might be supplied by an IEEE 1588 source. Then, referencing the synchronized time base to the external time signal in Step 404 includes substeps. Step 404a writes the contents of the synchronized time base (STB) into a snapshot register. Step 404b freezes the contents of the snapshot register. Step 404c compares the detected packet to the contents of the snapshot register. Step 404d calculates a difference value, and Step 404e modifies the synchronized time base by the difference value.

In another aspect, linking the synchronized time base to the external time signal in Step 404 includes establishing a synchronized time base with a first number of bits of resolution. Then, clocking the channel time base using the synchronized time base in Step 406 includes clocking the channel time base with a second number of bits of resolution, less than, or equal to the first number.

In another aspect, Step 407 services a channel with data words in a periodic cycle, in response to the synchronized time base. For example, servicing the channel in a periodic cycle may include interacting with a plurality of channels in a single cycle, and servicing each channel within the cycle.

In a different aspect, using the channel to perform programmable timer functions in Step 408 includes substeps. Step 408a detects an event at a channel external interface, and Step 408b stores a channel time base counter value occurring at the time of the detected event. Then, referencing the synchronized time base to the external time signal in Step 404 includes alternate substeps. Step 404f compares the stored channel time base counter value with an expected value. Step 404g calculates a difference value. Step 404h modifies the synchronized time base by the difference value.

In one aspect, linking the synchronized time base to the external time signal in Step 404 includes supplying the synchronized time base as an external time signal. That is, the synchronized time base supplies a clock signal to external devices, as described in the explanation of FIG. 3, above.

A system and method have been provided for synchronizing a programmable timer time base to an external time signal. Some examples of external sources have been provided to illustrate the invention. Some examples of timer functions that can be controlled using a synchronized time base have also been presented. However, the invention is not limited to merely these examples. Other variations and embodiments of the invention will occur to those skilled in the art.

I claim:

1. A method for synchronizing a programmable timer time base and an external time signal, comprising:
    linking a synchronized time base to an external time signal;
    clocking a channel time base with the synchronized time base; and
    using a channel to perform programmable timer functions in response to the channel time base, wherein
    using the channel comprises:
        detecting an event at a channel external interface; and
        storing a channel time base counter value occurring at the time of the detected event, and
    linking the synchronized time base comprises:
        comparing the stored channel time base counter value with an expected value;
        calculating a difference value; and
        modifying the synchronized time base by the difference value.

2. The method of claim 1, wherein using the channel to perform programmable timer functions comprises performing at least one timer function comprising input capture, output compare, quadrature decoding, pulse measurement, frequency measurement, or pulse width modulation (PWM) functions.

3. The method of claim 1 wherein using the channel to perform programmable timer functions in response to the channel time base comprises:
    supplying counter values to the channel from the channel time base; and,
    performing a channel input capture function in response to the channel time base counter values.

4. The method of claim 1 further comprising:
    accepting an external time signal at an external interface comprising IEEE 1588, Global Positioning Satellite (GPS), Ethernet Powerlink, Stratum TDM Synchronization, or Intel Range Instrumentation Group (IHIG) standards; and,
    wherein linking the synchronized time base to the external time signal comprises referencing the synchronized time base to the accepted external time signal.

5. The method of claim 4 wherein accepting the external time signal at the external interface comprises detecting a packet with a time value;

wherein referencing the synchronized time base to the accepted external time signal comprises:
writing the contents of the synchronized time base into a snapshot register;
freezing the contents of the snapshot register;
comparing the detected packet to the contents of the snapshot register;
calculating a difference value; and,
modifying the synchronized time base by the difference value.

6. The method of claim 1 wherein linking the synchronized time base to the external time signal comprises establishing a synchronized time base with a first number of bits of resolution; and,
wherein clocking the channel time base using the synchronized time base comprises clocking the channel time base with a second number of bits of resolution, less than, or equal to the first number.

7. The method of claim 1 further comprising:
servicing a channel with data words in a periodic cycle, in response to the synchronized time base.

8. The method of claim 7 wherein servicing the channel in a periodic cycle comprises:
interacting with a plurality of channels in a single cycle; and,
servicing each channel within the cycle.

9. The method of claim 1 wherein linking the synchronized time base to the external time signal comprises supplying the synchronized time base as an external time signal.

10. A system for synchronizing a time base and an external time signal, comprising:
a channel performing programmable timer functions in response to a loaded data word;
a synchronized time base linked to an external time signal, and having an interface to supply a clock signal;
a channel time base having an interface to receive clock signals from the synchronized time base and an interface to provide counter values to a channel;
a timer service engine (TSE) having an interface to receive the clock signal from the synchronized time base, and an interface to service the channel with data words in a periodic cycle derived from the synchronized time base; and
a plurality of channels, wherein
the TSE establishes a cycle having a first number of synchronized time base clock signals, and services the channel for a second number of synchronized time base clock signals each cycle; and
the TSE interacts with the plurality of channels in a single cycle, and services each channel within the cycle.

11. The system 10 wherein the channel performs timer functions using the channel time base counter values, the functions comprising at least one of input capture, output compare, quadrature decoding, pulse measurement, frequency measurement, or pulse width modulation (PWM) functions.

12. The system of claim 10 further comprising:
a synchronization interface connected to the synchronized time base to accept an external time signal comprising IEEE 1588, Global Positioning Satellite (GPS), Ethernet Powerlink, Stratum TDM Synchronization, or Inter Range Instrumentation Group (HUG) standards; and,
wherein the synchronized time base supplies a clock signal referenced to the external time signal.

13. The system of claim 12 wherein the synchronization interface accepts a packet with a time value;
the system further comprising:
a snapshot register having an interface to write the contents of the synchronized time base; and,
wherein the synchronized time base freezes the contents of the snapshot register when the packet is received, compares the contents of the snapshot register to the packet, calculates a difference value in response to the comparison, and modifies the synchronized time base using the calculated difference value.

14. The system of claim 10 wherein synchronized time base establishes a time base with a first number of bits of resolution and provides a dock signal with a second number of bits of resolution, less than, or equal to the first number of bits.

15. The system of claim 10 wherein the channel detects an event at a channel external interface and a channel time base counter value occurring when the event is detected;
wherein the TSE stores the channel time base counter value in memory; and,
wherein the synchronized time base compares the stored channel time base counter value with an expected value, calculates a difference value, and modifies the synchronized time base by the difference value.

16. The system of claim 10 further comprising:
a synchronization interface connected to the synchronized time base; and,
wherein the synchronized time base supplies a clock signal, via the synchronization interface, as an external time signal to a connected device.

17. A system for synchronizing a time base and an external time signal, comprising:
a channel performing programmable timer functions in response to a loaded data word;
a synchronized time base linked to an external time signal, and having an interface to supply a clock signal; and
a channel time base having an interface to receive clock signals from the synchronized time base and an interface to provide counter values to the channel a timer service engine (TSE) having an interface to receive the clock signal from the synchronized time base, and an interface to service the channel with data words in a periodic cycle derived from the synchronized time base, wherein
the channel detects an event at a channel external interface and a channel time base counter value occurring when the event is detected;
the TSE stores the channel time base counter value in memory; and
the synchronized time base compares the stored channel time base counter value with an expected value, calculates a difference value, and modifies the synchronized time base by the difference value.

18. The system 17 wherein the channel performs timer functions using the channel time base counter values, the functions comprising at least one of input capture, output compare, quadrature decoding, pulse measurement, frequency measurement, or pulse width modulation (PWM) functions.

19. The system of claim 17 further comprising:
a synchronization interface connected to the synchronized time base to accept an external time signal comprising IEEE 1588, Global Positioning Satellite (GPS), Ethernet Powerlink, Stratum TDM Synchronization, or Inter Range Instrumentation Group (HUG) standards; and,
wherein the synchronized time base supplies a clock signal referenced to the external time signal.

20. The system of claim 19 wherein the synchronization interface accepts a packet with a time value;

the system further comprising:

a snapshot register having an interface to write the contents of the synchronized time base; and, wherein the synchronized time base freezes the contents of the snapshot register when the packet is received, compares the contents of the snapshot register to the packet, calculates a difference value in response to the comparison, and modifies the synchronized time base using the calculated difference value.

21. The system of claim 17 further comprising:

a synchronization interface connected to the synchronized time base; and wherein the synchronized time base supplies a clock signal, via the synchronization interface, as an external time signal to a connected device.

* * * * *